Borrer & Qualter,
Steam-Engine Piston.
N°. 57,648.  Patented Aug. 28, 1866.
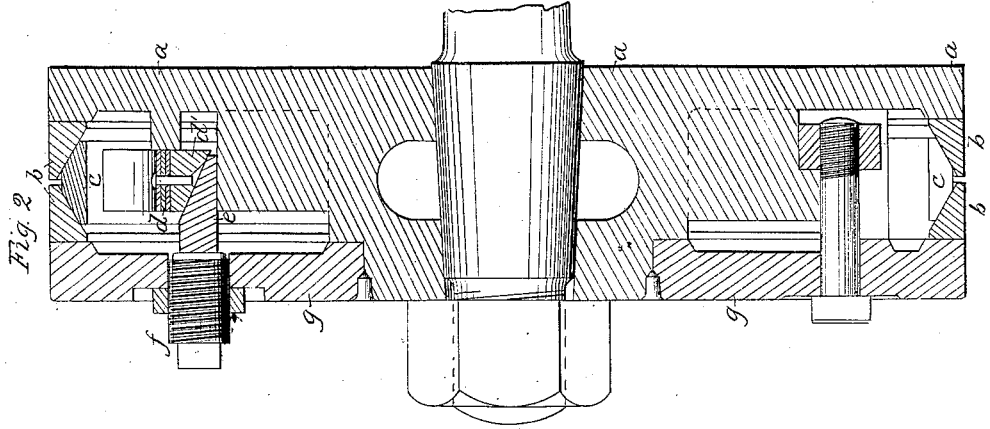
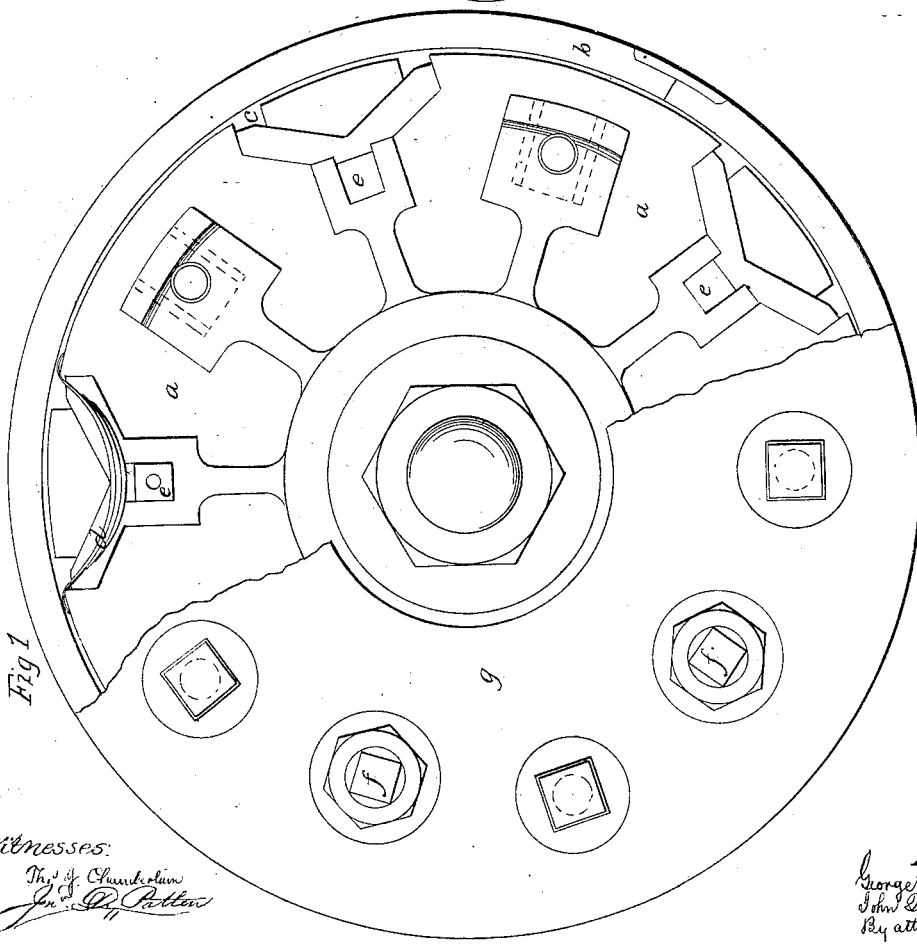
Witnesses:
Inventor
George Borrer
John Qualter
By atty A.P. Stoughton

UNITED STATES PATENT OFFICE.

GEO. BOWER, OF ASHTON-UNDER-LYNE, COUNTY OF LANCASTER, AND JOHN QUALTER, OF BARNSLEY, COUNTY OF YORK, ENGLAND.

IMPROVEMENT IN PISTONS FOR STEAM-ENGINES.

Specification forming part of Letters Patent No. 57,648, dated August 28, 1866.

*To all whom it may concern:*

Be it known that we, GEORGE BOWER, of Ashton-under-Lyne, in the county of Lancaster, molder, and JOHN QUALTER, of Barnsley, in the county of York, England, have invented certain new and useful Improvements in Metallic Pistons; and we hereby declare the following to be a full, clear, and exact description thereof, reference being had to the annexed sheet of drawings, forming part of this specification.

Our invention is designed for the purpose of maintaining a steam-tight packing between the piston and cylinder in steam-engines; and the improvement is of particular importance when wedges and screws are employed to act upon and expand the packing.

Our improvements consist, first, in the novel application, employment, and use of springs, constructed similarly to a coach-spring—that is, composed of plates of metal—and interposed between the interior space of the V-packing-ring and the wedges, screws, or other mechanical medium that may be employed to expand the packing-rings. These springs, composed of a series of plates, as a coach-spring, being the peculiar feature of our invention, we would remark that they are applicable to most descriptions of pistons, and we employ them in contradistinction to any springs consisting only of one plate, inasmuch as the combination of plates is more evenly elastic and more serviceable.

In the drawings, Figure 1 is a plan, with the cover partly broken off, of a piston having the springs composed of plates of metal applied thereto, such springs being acted upon by inclined planes interposed between them and the piston-block, and actuated by screws passing through the piston-cover. Fig. 2 is a section of the same.

$a\ a$ is the piston-block; $b\ b$, the packing-rings; $c\ c$, the V-ring, used to keep the rings $b\ b$ in contact with the interior of the cylinder, as in ordinary use. $d\ d$ are the laminated springs, composed of plates of metal, similar to a coach-spring, and used to sustain an elastic pressure upon the V-ring, which is obtained by means of the wedges $e\ e$ and screws $f\ f$ passing through the cover $g$. The wedges $e$ act upon the wedge pieces $d'$, riveted to the back of each spring $d$.

In the drawings we have only shown one of the springs $d$; but it is evident that there must be as many springs $d$ as there are wedges $e$ and screws $f$, and the number depends upon the diameter of the piston.

Having now described the nature of the said invention, together with the method of carrying the same into practical effect, we would remark, in conclusion, that what we claim herein as new, and desire to secure by Letters Patent of the United States of America, is—

In combination with springs composed of a series of plates, the wedges $e$ and wedge-pieces $d'$, combined and arranged to operate in the manner and for the purpose substantially as herein described.

In testimony whereof we have hereunto set our hands before two subscribing witnesses.

GEORGE BOWER.
JOHN QUALTER.

Witnesses:
H. B. BARLOW,
*Patent Agent, Manchester.*
JOHN PERKINS,
*Draftsman, Manchester.*